Dec. 6, 1960     A. A. HOLLAND     2,963,161
FILTERING APPARATUS

Filed Jan. 28, 1959     2 Sheets-Sheet 1

INVENTOR
Arthur A. Holland
BY Alex. E. MacRae
ATTORNEY

Dec. 6, 1960

A. A. HOLLAND 2,963,161

FILTERING APPARATUS

Filed Jan. 28, 1959

2 Sheets-Sheet 2

INVENTOR
Arthur A. Holland
BY Alex. E. McRae
ATTORNEY

United States Patent Office 2,963,161
Patented Dec. 6, 1960

2,963,161
FILTERING APPARATUS

Arthur A. Holland, 1705 N. 12th Ave., Pensacola, Fla.

Filed Jan. 28, 1959, Ser. No. 789,699

2 Claims. (Cl. 210—401)

This invention relates to "filtering apparatus."

Filtering machines frequently include the use of an endless filter medium, which may comprise a foraminous wire of metal, plastic composition or the like, an endless drainage belt which may comprise a succession of grids or the like, an endless traction belt for supporting and driving the filtering and drainage assembly, and an endless valve seat belt for imparting suction by means of a suction box to the filter medium and drainage areas of the drainage belt.

The plurality of endless members described are frequently difficult to maintain in alignment and in proper mutual relation to each other. Moreover, it has been difficult to provide an effective drainage belt which will at the same time satisfactorily fulfill the operative requirements of the machine.

It is an object of this invention to provide a filtering apparatus having a plurality of endless members wherein means are provided for maintaining said members in satisfactory mutual relationship for effective operation.

Another object is to provide in an apparatus of the type set forth, a drainage belt of simple convenient manufacture and of increased effectiveness in use.

Another object is to provide, in said apparatus, independent means for maintaining desired tension and alignment of the endless members.

Another object is to provide an improved mounting means for the endless filter medium in a filtering apparatus.

Figure 1:
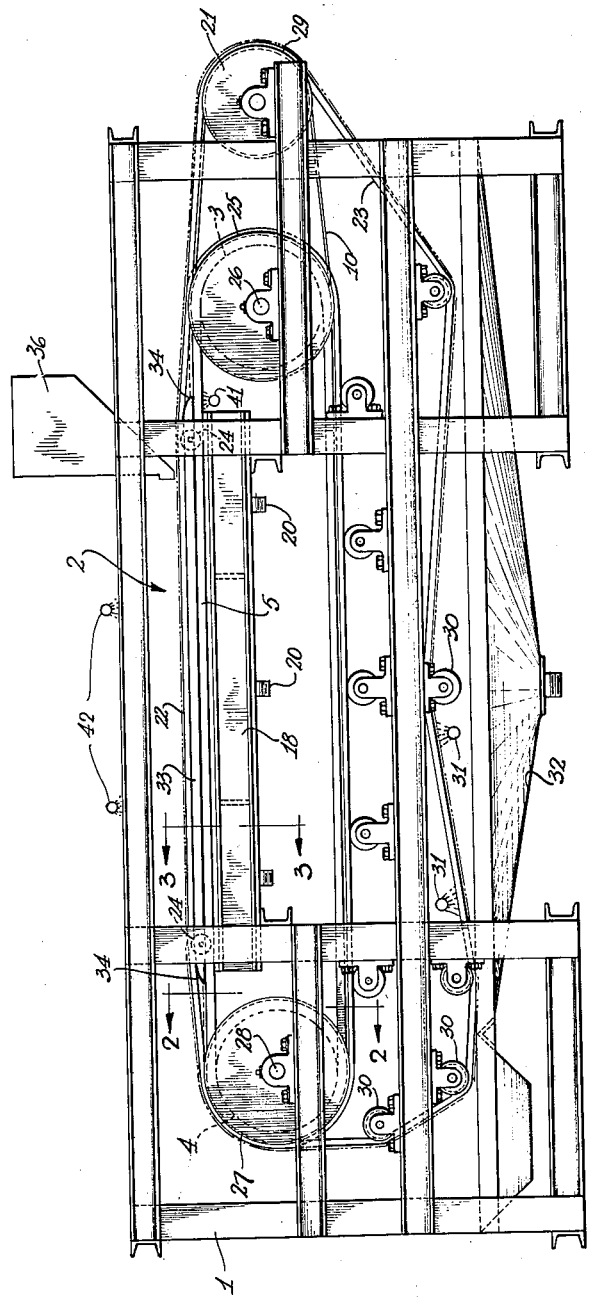
Figure 4:
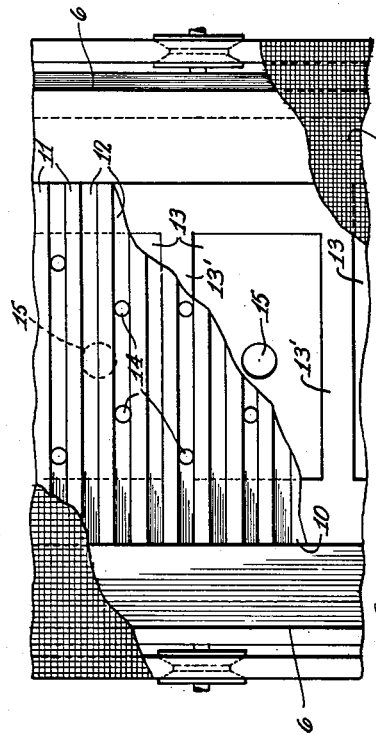
Figure 3:
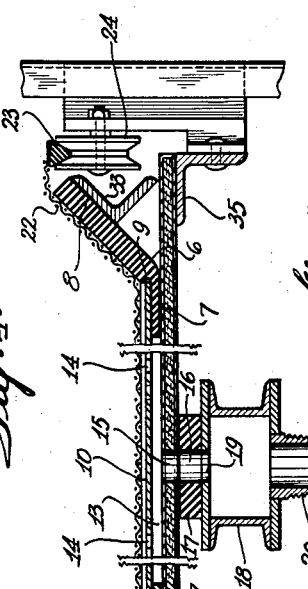
Figure 6:
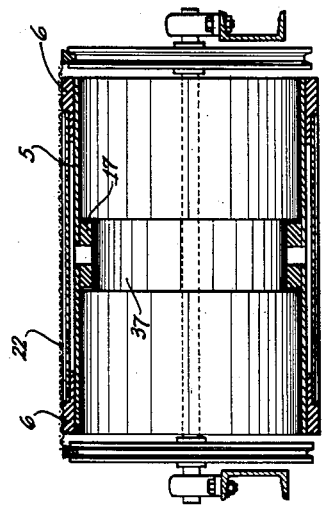
Figure 5:
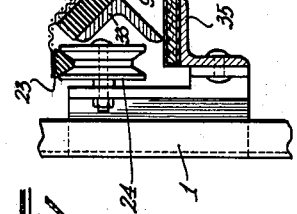

Other objects, details and advantages of the invention will become apparent from the following description, with particular reference to the accompanying drawings, in which Figure 1 is a side elevation of a filtering apparatus in accordance with the invention, Figure 2 is a partial sectional end elevation on line 2—2 of Figure 1, Figure 3 is an enlarged sectional elevation on line 3—3 of Figure 1, Figure 4 is an enlarged partial plan view, and Figure 5 is a partial side elevation of an alternative form of washing means for the filter medium.

In the drawings, 1 is a main frame and 2 an endless filter assembly supported on end drums 3 and 4 rotatably mounted in the frame. Drum 3 defines the feed end of the machine and drum 4 the discharge end. Drum 4 may be driven in any suitable manner (not shown).

The filter assembly 2 comprises a main traction or drive belt 5 which may be formed of plural ply fabric covered with rubber or the like. It will be observed that the traction belt engages the drums 3 and 4 and travelling movement will be imparted thereto on driving of drum 4.

Mounted on drive belt 5 are a pair of edge belts 6 which may be formed of rubber or like plastic composition flexible material but preferably are formed of pure gum rubber. Each edge belt 6 overlies a minor marginal portion of drive belt 5 and consists of an inner section 7 cemented or otherwise secured to the underlying surface of belt 5 and an outer section 8 of greater thickness than that of the inner section and unsecured to the underlying surface of belt 5 whereby it may be flexed outwardly therefrom. The outer edge of section 8 substantially coincides with the adjacent edge of belt 5 when section 8 is in engagement therewith. The bottom surface of each edge belt 6 is continuous for unobstructed engagement with the underlying surface of belt 5 whereas a shoulder 9 in the top surface defines the boundary between section 7 and 8.

Mounted on edge belts 6 is an endless grid or drainage belt 10 formed of flexible material such as rubber, plastic composition, rubber and fabric, or the like. The under surface of the edge portions of belt 10 are arranged to seat upon the inner sections 7 of edge belts 6 with the edges thereof in proximity to the shoulders 9 which therefore position and align the belt 10 on the edge belts 6. The top surface of belt 10 is transversely ribbed, i.e., it is provided with a multiplicity of transverse ribs 11 with intervening drainage grooves 12.

It will be observed that spaces or pockets 13 between interconnecting means 13' underlie the major central portion of grid belt 10 as defined by the opposed edges of edge belts 6. These spaces 13 constitute a suction and drainage area with which the drainage grooves 12 communicate by means of holes or apertures 14 in the bottom wall of each groove. As shown in Figure 4, the holes 14 in one groove may be staggered with respect to those in adjacent grooves.

Suction is applied to and drainage effected from the spaces 13 by way of a plurality of apertures 15 in drive belt 5. Each such aperture 15 communicates with a corresponding aperture 16 in a valve seat band 17 formed of rubber or like material and cemented to the under surface of belt 5. Band 17 is arranged to slide, during the upper traveling portion of the filter assembly, over a suction box 18 for substantially sealing engagement therewith. The interior of the suction box communicates with apertures 16 through a slot 19. Box 18 has outlets 20 for connection to a source of vacuum.

Grid belt 10 is unattached to drive belt 5 but is held upon the edge belts 6 and driven therewith by virtue of the suction imparted to the grid belt by the suction box. A portion of grid belt 10 extends beyond tail drum 3 and is supported on a tension drum or pulley 21. It will thus be apparent that tension of the belt 10 may be readily and independently adjusted by movement of the pulley 21. It will also be apparent that a corresponding tension drum may be employed at the discharge end of the machine.

An endless filter medium 22 is composed of foraminous wire cloth of conventional form. In its upper portion of travelling movement, the filter medium 22 is arranged to overlie and engage the grid belt 10 and edge belt sections 8. In accordance with the invention, means are provided for maintaining the filter medium in alignment and in desired relation with the other members of the filter assembly. Such means comprises belts 23, which may be of any suitable form but are shown as of V type, to which is secured, as by tacks, cement, adhesive or the like, the marginal sections of the filter medium which extend beyond the edges of the edge belts 6. Belts 23 are mounted on a plurality of free-running pulleys 24 carried by the frame for engagement by the belts during the upper portion of their travel. Such belts also extend over tail pulleys 25 mounted on shaft 26 which also constitutes the mounting shaft of drum 3, as well as over drive pulleys 27 mounted on shaft 28 which also constitutes the driving shaft for drum 4. Belts 23 also extend over free-running tension pulleys 29 which may be coaxially mounted in respect of tension pulley 2.

The lower portion of travel of the filter medium and belts 23 is guided by means of a plurality of free-running pulleys 30 mounted in the frame. It will be observed that the pulleys 30 guide the filter medium in a path spaced below the lower path of travel of drive belt 5, grid belt 10, and associated elements whereby the filter medium may be subjected on both sides to cleaning sprays 31, the wash water from which may be collected in a pan 32.

Means are provided for imparting a trough like shape to the upper portion of travel of the filter medium whereby the material to be filtered will be retained thereon during the filtering operation. Such means comprises, as shown, a pair of inclined slides 33 carried by the frame and each engageable by the under surface of an edge belt section 8 to tilt the latter upwardly, as clearly shown in Figure 3. Each slide 33 has reduced or pointed end portions 34 the upper surfaces of which are curved to provide a guide during the initial tilting movement of the edge sections 8 and the return movement thereof. It will be observed that the slides 33 are interposed between the edge sections 8 and the drive belt 5 during the upper travelling movement thereof. During such upper travelling movement, the edge portions of drive belt 5 are supported on slides 35 fixed to the frame.

A feed hopper 36 is provided to feed material to be filtered onto the filter medium adjacent its initial formation into troughlike shape. The filter cake is discharged from the filter medium as it passes over the drive drum 4 and is collected in any conventional manner.

It is pointed out that there is slight clearance between each edge of grid belt 10 and the adjacent shoulder 9 of the edge belt when the tiltable section 8 thereof is lying flat and in engagement with drive belt 5. However, when such section 8 is tilted upwardly, the edges of grid belt 10 will engage the shoulders 9, as shown in Figure 3, to seal such joints.

As shown in Figure 2, drum 4 is centrally recessed at 37 to receive the valve seat band 17. Drum 3 is similarly recessed.

The operation of the machine will be apparent from the foregoing description.

It will be observed that the structure described permits the maintenance of positive and accurate alignment and tension of each member of the travelling filter assembly. Moreover, the use of a continuous and unitary grid belt eliminates the need for special mounting arrangements as is required when a series of separate grids are employed as well as permitting convenient tensioning and alignment thereof.

Figure 5 illustrates means for subjecting the filter medium 22 to treatment in a bath. As shown, the filter is led through a pan 38 containing liquid 39 by means of guide pulleys 40. The bath may include for dissolving certain chemical deposits on the medium agents.

The filter medium may also be subjected to a washing treatment in a body of water in which is positioned ultrasonic vibration means to effect cleansing of the medium.

In addition to the sprays 31, a spray 41 may be provided to impinge on the valve seat band 17 as it contacts the suction box to remove grit therefrom and to lubricate its passage thereover.

One or more sprays 42 may also be provided on the top run of the filter media to provide wash water for removal of acids and the like from the filter cake.

I claim:

1. Filtering apparatus comprising a frame, a pair of end drums rotatably mounted in said frame, and an endless filter assembly mounted for travelling movement on said drums and having upper and lower portions of travel, said filter assembly comprising a drive belt, an edge belt mounted on each edge portion of said drive belt, each said edge belt having an inner section fixed to said drive belt and an outer section tiltable with respect to said drive belt, a grid belt seated on said inner sections of said edge belts in spaced relation to said drive belt, means connecting said edge belts thereby forming pockets defined by said grid belt, said edge belts and said drive belt to provide a substantially uniform filter area, a valve seat band fixed to the inside of said drive belt, a suction box disposed beneath the upper portion of travel of said filter assembly, a filter medium supported on the outside of said grid belt, said filter medium having a marginal portion on each side thereof projecting outwardly beyond said grid belt, a continuous aligning belt fixed to each edge of said filter medium, separate means supporting said aligning belt, said means being located outwardly from said edge belt, said grid belt, drive belt, valve seat band, and suction box having communicating passages to impart suction to said filter medium.

2. Filtering apparatus as defined in claim 1, including a shoulder on each said edge belt for positioning said grid belt thereon.

References Cited in the file of this patent

UNITED STATES PATENTS

| | | |
|---|---|---|
| 594,415 | Morrison | Nov. 30, 1897 |
| 1,876,399 | Catala | Sept. 6, 1932 |
| 2,629,244 | Rand | Feb. 24, 1953 |
| 2,873,028 | Bried | Feb. 10, 1959 |
| 2,880,875 | Alston | Apr. 7, 1959 |